(12) United States Patent
Rochberger

(10) Patent No.: US 6,396,842 B1
(45) Date of Patent: May 28, 2002

(54) METHOD OF SEARCHING USING LONGEST MATCH BASED RANDIX SEARCH TRIE WITH VARIABLE LENGTH KEYS AND HAVING PREFIX CAPABILITY

(75) Inventor: Haim Rochberger, Netanya (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/070,452

(22) Filed: Apr. 30, 1998

(51) Int. Cl.$^7$ ................................................ H04L 12/28
(52) U.S. Cl. ........................................ 370/408; 370/255
(58) Field of Search .............................. 370/255, 256, 370/258, 392, 393, 395, 397, 399, 408, 409

(56) References Cited

U.S. PATENT DOCUMENTS

| | | | | |
|---|---|---|---|---|
| 5,058,144 A | * | 10/1991 | Fiala et al. | 375/122 |
| 5,291,477 A | | 3/1994 | Liew | 370/54 |
| 5,361,256 A | | 11/1994 | Doeringer et al. | 370/60 |
| 5,420,862 A | | 5/1995 | Perlman | 370/85.13 |
| 5,455,865 A | | 10/1995 | Perlman | 380/49 |
| 5,483,536 A | | 1/1996 | Gunji et al. | 370/85.14 |
| 5,491,690 A | | 2/1996 | Alfonsi et al. | 370/60 |
| 5,495,479 A | | 2/1996 | Galaand et al. | 370/60 |
| 5,544,327 A | | 8/1996 | Dan et al. | 395/250 |
| 5,550,818 A | | 8/1996 | Brackett et al. | 370/60 |
| 5,566,014 A | | 10/1996 | Glance | 359/124 |
| 5,590,118 A | | 12/1996 | Nederlof | 370/218 |
| 5,600,638 A | | 2/1997 | Bertin et al. | 370/351 |
| 5,603,029 A | | 2/1997 | Aman et al. | 395/675 |
| 5,629,930 A | | 5/1997 | Beshai et al. | 370/396 |
| 5,649,108 A | | 7/1997 | Spiegel et al. | 395/200.12 |
| 5,673,263 A | | 9/1997 | Basso et al. | 370/396 |
| 5,995,971 A | * | 11/1999 | Douceur et al. | 707/102 |
| 6,011,795 A | * | 1/2000 | Varghese et al. | 370/392 |
| 6,018,524 A | * | 1/2000 | Turner et al. | 370/392 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257, (1988).

Doeringer, W. et al., "Routing on Longest–Matching Prefixes", *IEEE/ACM Tansactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

\* cited by examiner

*Primary Examiner*—Dang Ton
*Assistant Examiner*—Toan Nguyen
(74) *Attorney, Agent, or Firm*—Howard Zaretsky

(57) ABSTRACT

A method of searching utilizing a longest match based Radix Search Trie with variable length keys and having the ability to handle keys being prefixes of other keys. The method is based on the well known Patricia search trie algorithm. The address prefixes representing the keys for the tree are modified before being processed by the algorithm. A single byte is added to the beginning of each address prefix which is set equal to the length of the address prefix. The combined address length byte followed by the address prefix is used by the Patricia algorithm . When one address is the prefix of another, the length byte will make both addresses unique and distinct from each other. The conventional Patricia search can now be used since the keys have been made unique. A circular prefix list is maintained in descending numerical order comprising an entry for each distinct value of address length insure that the longest matching address is found.

19 Claims, 9 Drawing Sheets

METHOD OF SEARCHING USING LONGEST MATCH BASED RANDIX SEARCH TRIE WITH VARIABLE LENGTH KEYS AND HAVING PREFIX CAPABILITY

FIELD OF THE INVENTION

The present invention relates generally to data communication networks and more particularly relates to a method of searching utilizing longest match based Radix Search Trie method using variable length keys and having the ability of keys to prefix each other.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level wherein the lowest level nodes are organized into peer groups. A logical node in the context of the lowest hierarchy level is the lowest level node. A logical node is typically denoted simply as a node. A peer group is a collection of logical nodes wherein each node within the group exchanges information with the other members of the group such that all members maintain an identical view of the group. When a logical node becomes operational, the nodes attached to it initiate and exchange information via a well known Virtual Channel Connection (VCC) used as a PNNI Routing Control Channel (RCC).

Hello messages are sent periodically by each node on this link. In this fashion, the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets which contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed in one of the node's database packets. PTSE's for which new instances are received after the exchanging status has been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network. Additional information on link state routing can be found in Section 9.2 of the book Interconnections: Bridges and Routers by Radia Perlman, Addison-Wesley, 1992, incorporated herein by reference.

Once the topology of the network is learned by all the nodes in the network, routes can be calculated from source to destination users. A routing algorithm commonly used to determine the optimum route from a source node to a destination node is known as the Dijkstra algorithm. The Dijkstra algorithm is used to generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are possible best paths. Once it is determined that a path is in fact the best possible, the node is moved from the Tentative List to the Path List.

The algorithm begins with the source node (self) as the root of a tree by placing the source node ID onto the Path List. Next, for each node N placed in the Path List, N's nearest neighbors are examined. For each neighbor M, add the cost of the path from the root to N to the cost of the link from N to M. If M is not already in the Path List or the Tentative List with a better path cost, add M to the Tentative List.

If the Tentative List is empty, terminate the algorithm. Otherwise, find the entry in the Tentative List with the minimum cost. Move that entry to the Path List and repeat the examination step described above.

More detailed information on the Dijkstra algorithm can be found in Section 9.2.4 of the book Interconnections: Bridges and Routers by Radia Perlman, Addison-Wesley, 1992, incorporated herein by reference.

In PNNI routing, one of the first steps performed in the route calculation process is to find a full match in the topology database on the destination address. Note that in PNNI, a full match search is always performed as opposed to a partial match search, regardless of the length of the address. This means that the longest of all the addresses in the database that exactly matches the destination address is to be searched for. A more detailed description of full matching versus partial matching can be found in U.S. Pat. No. 5,940,396 entitled "METHOD OF ROUTING IN AN ASYNCHRONOUS TRANSFER MODE NETWORK," similarly assigned and incorporated herein by reference in its entirety.

In performing the search of the topology database, a simple sequential search will work but it is very inefficient in both time and computing resources. Other, more efficient search techniques are known some of which are described hereinbelow.

A well known radix search method is the digital tree search which is based on the binary tree search. The difference being that the decision to branch is based on the bits of the key rather than on the results of a comparison between the keys. At the first level the leading bit is used, followed by the second leading bit at the second level, and so on until an external node is found.

In cases where the search keys are relatively long as in network applications, the cost of comparing a search key for equality with a key from the tree can be a major cost factor. Digital tree searching uses such a comparison at each node of the tree.

Radix search trees do not store keys in the tree nodes but rather store the keys in external nodes of the tree. Thus, there are two types of nodes: (1) nodes which contain links to other nodes and (2) nodes which comprise keys and no links. This search method is known as 'trie' for its usefulness for retrieval operations. A search for a key in such a tree comprises branches are taken in accordance with the key's bits. No compare operation is performed until a key on the tree is reached. Each key in the tree is stored on the path described by the leading bit pattern of the key and each search key winds up at a key, thus requiring only one full key comparison to complete the search.

The radix search method described above has two disadvantages: (1) one way branching leads to the creation of extra nodes in the tree and (2) the tree comprises two different types of nodes. The Practical Algorithm To Retrieve Information Coded In Alphanumeric search algorithm, better known as the Patricia search trie method. The Patricia method permits searching for N arbitrarily long keys in a tree with only N nodes and only requires one full key comparison per search. One way branching is avoided by each node containing the index of the bit to be tested to decide which path to take out of that particular node. External nodes are avoided by replacing links to external nodes (keys) with links that point upwards in the tree. The keys in the tree are stored in the nodes for reference when the bottom of the tree is reached.

The search in such a tree begins at the root and proceeds down the tree, using the bit index in each node to determine which bit to examine in the search key. If the bit is '0' the left direction is taken and if the bit is '1' the right direction is taken. The keys in the node are not examined at all in the way down the tree. Eventually, an upwards link is encountered whereby each upward link points to the unique key in the tree that has the bits that would cause a search to that link. If the key at the node pointed to by the first upward link encountered is equal to the search key, then the search is successful, otherwise it is not. For tries, i.e., retrieving, all searches terminate at external nodes, whereupon one full key comparison is performed to determine whether or not the search is successful.

More detailed descriptions of the binary, radix and Patricia search tree search algorithms can be found in Chapter 17 of Algorithms by Robert Sedgewick, Addison-Wesley, 1988, incorporated herein by reference.

A major disadvantage, however, of the conventional Patricia search trie algorithm is that no key can be a prefix of another key. Patricia search trees can handle variable length keys with the limitation that if one key is the prefix of another, the algorithm operates such that one of the keys will be dropped. The rule in this case is that there can only be one key that matches. This search algorithm is suitable when all the keys are unique and no one key is a prefix of another key. In a Patricia search, there is no such thing as a best match because the key is either in the tree or it is not. Recall that a full compare is only performed once, on the last leaf.

A diagram illustrating a portion of an example prior art Patricia search trie tree having a root and a single node is shown in FIG. 1. The node 12 comprises an index of 2 and a left pointer 16 to address C and a right pointer 18 to address B. The network comprises four nodes with the listed addresses A through D. Having knowledge of the network topology, each node attempts to insert the node prefixes into a Patricia tree. It is assumed that addresses B and C have already been inserted into the tree. The node then attempts to insert address A into the tree. Since address A differs in the second bit, a right branch is taken. A problem occurs because address B is a prefix of address A. Both addresses A and B cannot coexist in the tree simultaneously. One of the two addresses will be dropped.

Thus, the conventional search algorithms discussed above are not suitable for use in networks such as ATM. This is because the addressing structure of ATM networks based on PNNI routing are based on permitting addresses to be prefixes of other addresses. In PNNI based ATM networks, PNNI reachable addresses are intentionally selected to be prefixes of one another due to the address summarization feature of PNNI which permits network designers to construct large hierarchical networks. Large numbers of nodes are grouped into peer groups which are assigned logical addresses. Peer groups are formed in a hierarchical fashion with the addresses assigned to higher level peer groups being prefixes of the addresses assigned to lower level peer groups.

Note that the keys, which are comprised of a string of bits, as used in the prior art search algorithms are replaced with network addresses when applied to PNNI based routing in an ATM network.

One prior art solution is provided in "Routing on Longest-Matching Prefixes," W. Doeringer, G. Karjoth and M. Nassehi, IEEE Transactions on Networking, Vol. 4, No. 1, February 1996. The method describes a compact digital trie termed dynamic prefix tries with the ability to insert, delete and retrieve binary keys in a dynamic database. The binary keys can have arbitrary length and may be prefixes of one other which makes this solution suitable for use with routing algorithms.

A diagram illustrating the node structure for a prior art compact digital trie as described in the Doeringer et al. reference is shown in FIG. 2. The node structure 20 comprises an index 22, left key 24, right key 26, parent pointer 28, left subtrie pointer 30 and right subtrie pointer 32.

A major drawback to this approach is that it is much more complicated when compared to the Patricia search trie algorithm and the other conventional search trie algorithms. The algorithm makes heavy additions to the conventional Patricia algorithm in terms of complexity and computing resources needed. For example, it changes the structure of the basic tree, significantly modifies the process of entering keys and searching for a match and adds complexity by maintaining parent pointers and the ability to traverse the tree bi-directionally.

Further, additional memory resources are required for this algorithm over the Patricia algorithm. In particular, additional memory space is required for the node structure which comprises pointers to left and right keys, left and right nodes for subtree branches and a parent pointer.

SUMMARY OF THE INVENTION

The present invention is a method of searching utilizing a longest match based Radix Search Trie with variable length keys and having the ability to handle keys being prefixes of other keys. The method of the present invention is based on the well known Patricia search trie algorithm. Although the conventional Radix Search Trie tree method is used, the address prefixes representing the keys for the tree are modified before being inserted into the algorithm. An extra byte is added to the beginning of each address prefix. The byte that is added is equal to the length of the address prefix. The combined address length byte followed by the address prefix is then used as the key for performing the Patricia trie tree algorithm. Adding a byte holding the length to the address serves to make the address prefix unique. Thus, when one address is the prefix of another, the length byte will make both addresses unique and distinct from each other. The conventional Patricia search can now be used since the keys have been made unique.

Addresses of variable length are handled by creating and maintaining a prefix list comprising an entry for each distinct value of address length for all the nodes in the topology database. The entries are stored in a circularly linked list sorted in descending numerical order of the length field. This insures that the address being the longest match will be found when searching for a destination address.

There is provided in accordance with the present invention a method of searching utilizing a conventional Patricia search tree constructed from one or more nodes for storing one or more keys, the method comprising the steps of inserting a key into the tree: modifying the keys to be inserted into the tree so as to make each key unique with respect to other keys that may be prefixes thereof, inserting the modified key into the tree utilizing a conventional Patricia search tree algorithm, providing a list which includes entries for each different key length represented in the tree, each entry in the list including a length field and a count field, updating the list so as to maintain the entries in descending numerical order of the length field; searching the tree for a search key: determining the largest key length in the list, concatenating the key length onto the search key to form a modified search key, searching the tree with the modified search key utilizing a conventional Patricia search algorithm and determining the next largest key length in the list and repeating the steps of concatenating and searching until either the modified search key is found or the entries in the list are exhausted.

The step of modifying a key comprises the step of adding a number represented by a fixed length to the beginning of a key, the number having a value equal to the length of the key. The step of modifying a key comprises the step of adding a byte of data to the beginning of a key, the byte of data having a value equal to the length of the key. Also, the keys may be of variable length and may be prefixes of other keys in the tree. In addition, the keys may comprise address prefixes.

The byte of data may comprise a Private Network Node Interface (PNNI) level value and the list may comprise a circularly linked list. The method further comprises the step of incrementing the count field of an entry in the list when a key is added to the tree, the entry corresponding to the length of the key and the step of decrementing count field of an entry in the list when a key is removed from the tree, the entry corresponding to the length of the key.

Also, the method further comprises the step of removing an entry from the list when a key is removed from the tree and the key was the last key with that particular length and further comprises the step of storing a plurality of identical keys in the tree. The step of storing may comprise the step of storing the plurality of identical keys in a circularly linked list, the circularly linked list stored in the tree in similar fashion to that of other keys.

In addition, the of determining the largest key length in the list may comprise the step of maintaining a longest length variable indicating the entry in the list with the longest length. The step of determining the next largest length in the list may comprise the step of traversing the list to the next entry pointed to by the current entry.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DS | Database Summary |
| FDDI | Fiber Distributed Data Interface |
| FSM | Finite State Machine |
| IISP | Interim Inter-Switch Signaling Protocol |
| ITU | International Telecommunications Union |
| PNNI | Private Network to Network Interface |
| PTSE | PNNI Topology State Element |
| PTSP | PNNI Topology State Packet |
| RCC | Routing Control Channel |
| UNI | User to Network Interface |
| VCC | Virtual Channel Connection |

General Description

The present invention is a method of searching utilizing a longest match based Radix Search Trie with variable length keys and having the ability to handle keys being prefixes of other keys. The method of the present invention is based on the well known Patricia search trie algorithm which is described in detail in Chapter 17 of Algorithms by Robert Sedgewick, Addison-Wesley, 1988, incorporated herein by reference. Although the conventional Radix Search Trie tree method is used, the address prefixes representing the keys for the tree are modified before being inserted into the algorithm. An extra byte is added to the beginning of each address prefix. The byte that is added is equal to the length of the address prefix. The combined address length byte followed by the address prefix is used by the Patricia trie tree. Adding a byte holding the length to the address serves to make the address prefix unique. Thus, when one address is the prefix of another, the length byte will make both addresses unique and distinct from each other. The conventional Patricia search can now be used since the keys have been made unique.

Figure 1:
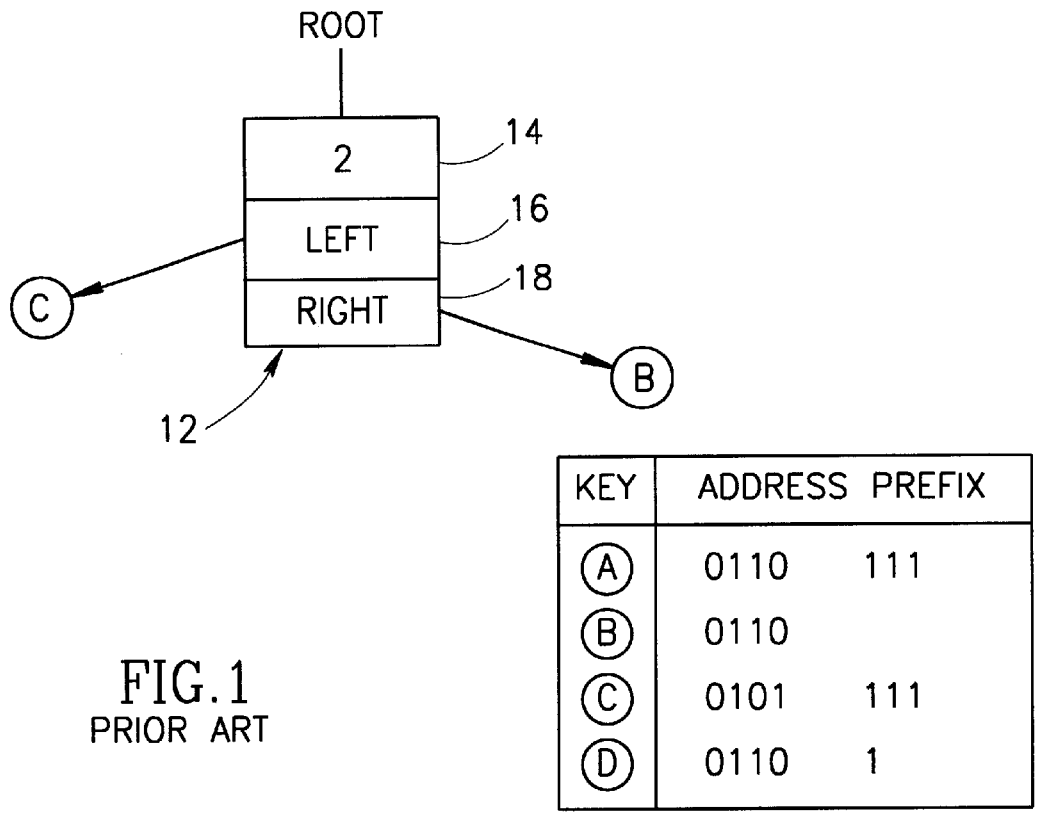
FIG. 1 is a diagram illustrating a portion of an example prior art Patricia search trie tree having a root and a single node.
Figure 2:
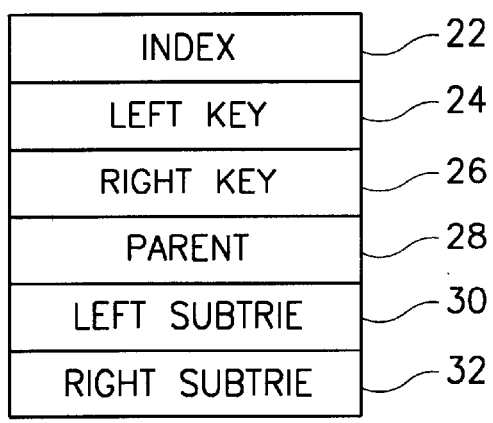
FIG. 2 is a diagram illustrating the node structure for a prior art compact digital trie based on Patricia tries.
Figure 3:
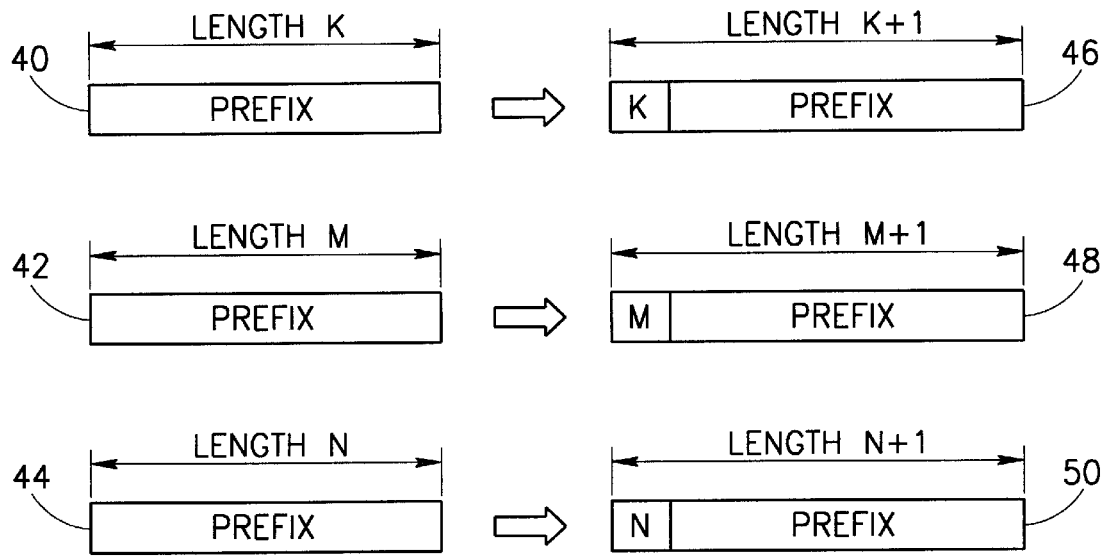
FIG. 3 is a diagram illustrating the method of the present invention of concatenating the address length onto the address prefix forming the key for the Patricia trie.

A diagram illustrating the method of the present invention of concatenating the address length onto the address prefix forming the key for the Patricia trie is shown in FIG. 3. For illustrative purposes only, three address prefixes are shown in FIG. 3. Address prefixes 40, 42, 44 having a length K, M, N, respectively. Note that the maximum value for K, M, N is 19 bytes or 152 bits. Each address prefix is then modified by having a one byte length value tacked onto the beginning of it. Thus, address prefix 40, having a length K, is transformed into address 46 having a byte with the value K followed by the original address prefix. The transformed address length now has a value of K+1. Similarly, address prefix 42, having a length M, is transformed into address 48 having a byte with the value M followed by the original address prefix. The transformed address length now has a value of M+1. Finally, address prefix 44, having a length N, is transformed into address 50 having a byte with the value N followed by the original address prefix. The transformed address length now has a value of N+1.

Figures 4, 5:
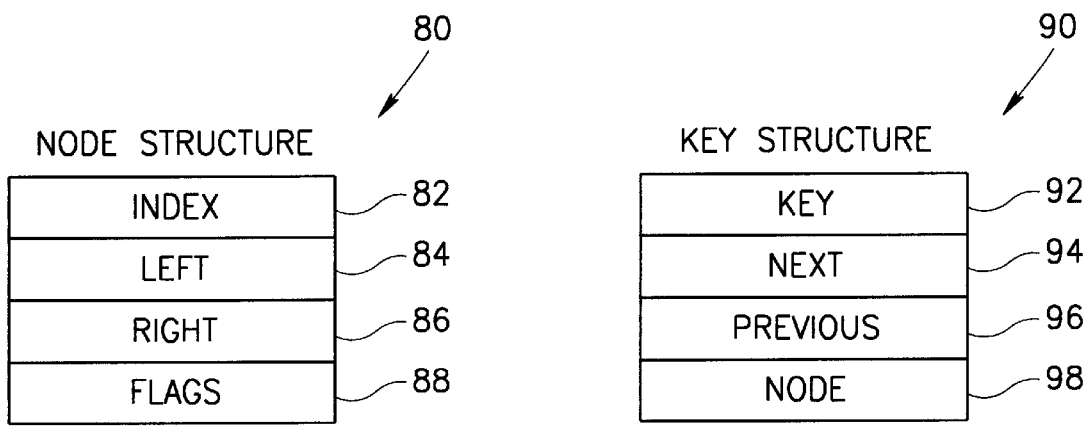
FIG. 4 is a diagram illustrating the node structure for the digital search trie method of the present invention.
FIG. 5 is a diagram illustrating the key structure for digital search trie method of the present invention.

In accordance with the method of the present invention, each node making up the search trie tree, may either point to keys or may point to subtrees that comprise nodes at a lower hierarchical level. A diagram illustrating the node structure for the digital search trie method of the present invention is shown in FIG. 4. As in the Patricia search trie trees, the node structure 80 comprises an index field 82, left pointer 84, right pointer 86 and a flags field 88. Both the left and right pointers may point to either a key or a node forming a subtree. Note, however, that each pointer cannot point to both a key and a subtree at the same time. The flags field 88 comprises bits associated with the left and right pointers indicating whether the left and right pointers point to a key or a subtree.

A diagram illustrating the key structure for digital search trie method of the present invention is shown in FIG. 5. The structure 90 of a key comprises the key 92 itself, a next pointer 94, previous pointer 96 and a node pointer 98. The key field is used to store the actual address prefix with the concatenated byte holding the address length.

An important feature of the present invention is that the search trie tree is capable of handling multiple destination addresses that are the same. In an ATM network, it is not uncommon for multiple nodes to have the same destination address. This is handled by implementing a circularly linked list for the keys. The next pointer field 94 and previous pointer field 96 are used to implement the circularly linked list, an example of which is presented hereinbelow. The node field 98, in the case of a PNNI ATM network, comprises a pointer to a data structure in the topology database holding nodal information used for purposes of routing, signaling, etc.

Another key aspect of the present invention is that keys, i.e., address prefixes, may be prefixes of one another. As described previously, a main feature of the PNNI routing algorithm used in ATM networks is that network destination address can be prefixes of other destination addresses. The prior art Patricia search trie tree is not capable of handling this. The present invention, however, implements this feature by creating and maintaining a circularly linked prefix list. An entry is placed in the list for each distinct address length corresponding to the keys placed in the Patricia trie tree. It is a basic assumption of the present invention that in a real network, the variation in the length of the address prefixes is limited to a few lengths. For example, the number of distinct address lengths is typically relatively small, ranging from 1 to 5 different lengths, e.g., 50, 80 and 90 bits. This assumption is generally valid for PNNI based ATM networks. Even if a network has numerous distinct address lengths, the method of the present invention can still be used albeit at a lower efficiency.

Figure 6:
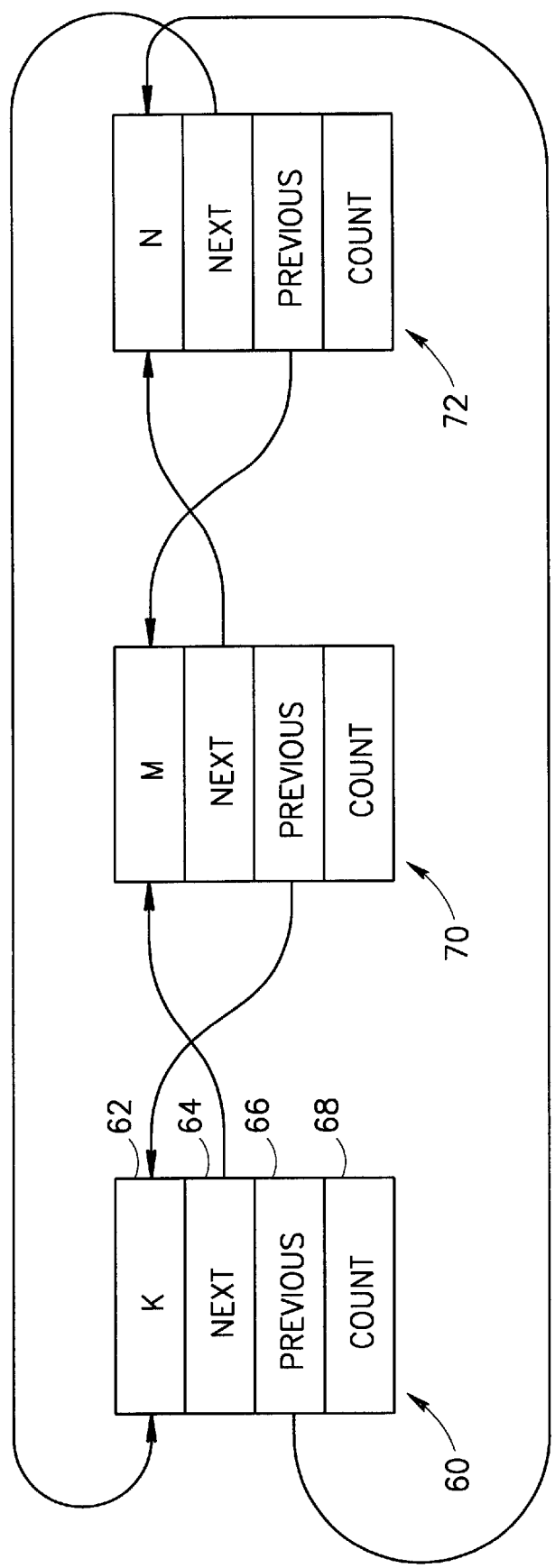
FIG. 6 is a diagram illustrating an example of a prefix list having a plurality of level entries.

An example of a circularly linked prefix list will now be presented. A diagram illustrating an example of a prefix list having a plurality of level entries is shown in FIG. 6. Continuing with the example shown in FIG. 3, there are three entries shown in FIG. 6. Prefix length entries 60, 70, 72 correspond to lengths K, M, N, respectively. Each entry in the prefix list, generally referenced 74, comprises a length field 62, next pointer 64, previous pointer 66 and a count field 68. The length field 62 contains the actual length for that entry. The next pointer 64 and previous pointer 66 are used to implement the circularly linked list. The count field 68 contains a count of the number of keys in the tree having that particular address length. The count field provides an indication of the number of keys in the tree having that particular address length.

The count field for a particular entry in the prefix list is incremented by one every time an address is added to the tree having the corresponding address length. Likewise, the count field for a particular entry in the prefix list is decremented by one every time an address is deleted from the tree having the corresponding address length. If the count equals one, then when the last key having that address length is removed from the tree, the entry for that length is deleted from the prefix list. Thus, the count field is used to determine when an entry in the prefix list should be removed because the last address having that particular length has been removed from the tree.

The order in which the entries are added to the address list is important. The entries in the address list are maintained in descending numerical order of the length field, i.e., the largest address is always at the top of the address list. Thus, with reference to FIG. 6, length K>M>N. Note that the next pointer of the N entry 72 points back to the K entry 60 and the previous pointer of the K entry points to the N entry.

Figure 7:
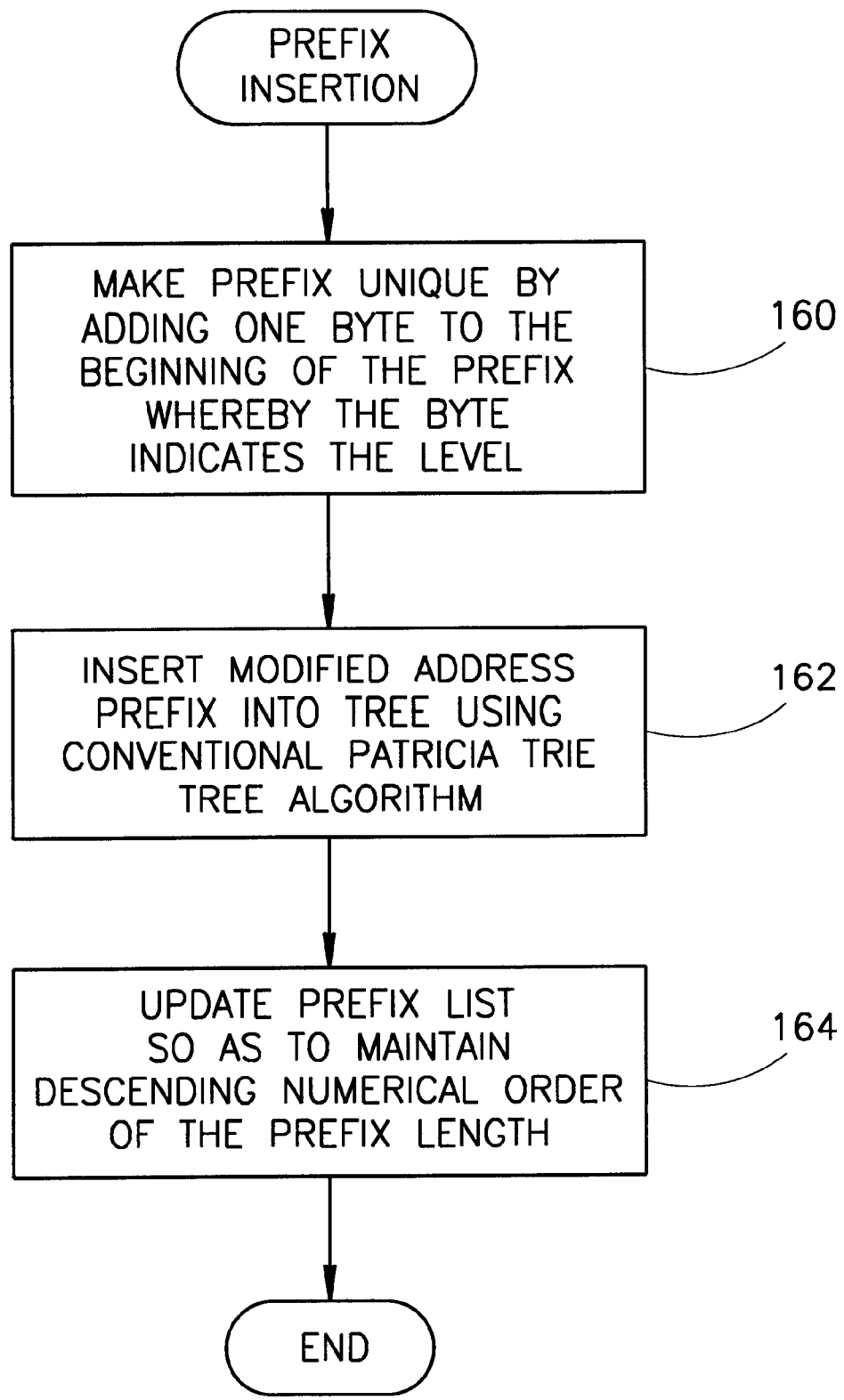
FIG. 7 is a flow diagram illustrating the method of inserting a prefix into the search trie tree.

The method of inserting a key into the search trie tree will now be described. A flow diagram illustrating the method of inserting a prefix into the search trie tree is shown in FIG. 7. The first step is to make the address prefix, i.e., the key, unique by adding one byte to the beginning of the address prefix. The byte that is added has the value of the length of the address, i.e., its level (for PNNI networks) (step 160). This step adds 8 bits to each address. Thus, the maximum address has a length of 152+8 =160 bits (20 bytes for PNNI). As a result of this step, if there are two addresses, wherein one is the prefix of the other, adding the length byte to them makes each address unique. Note that the key stored in the tree has a length equal to one byte plus the length of the address prefix. Typically, the length of the address prefix is less than the maximum length for node addresses. However, it is entirely possible that the length of all the addresses is the maximum address length of 19 bytes (note that the selector byte is preferably not stored).

Next, the modified address is inserted into the tree using well known Patricia search trie tree algorithm (step 162). Note that other radix search methods can also be used with the method of the present invention. It is important to also note that if the address is found to already exist in the tree, then an additional key structure entry is added to the circularly linked list of key structures.

Following insertion into the tree, the prefix list is updated so as to maintain descending numerical order of the length field holding the prefix length (step 164). If the address prefix is the first prefix to be placed in the tree, then a global variable HIGEST_PREFIX_LEN, which currently points to null, is set to the value of the length of the address placed in the tree. If the global variable HIGEST_PREFIX_LEN is not pointing to null, then it is compared to the length of the address to be added to the tree. If the prefix length is greater than HIGEST_PREFIX_LEN, an entry with the new length is added to the top of the circular list and the variable HIGEST_PREFIX_LEN is updated with the new length. If, however, the prefix length is less than HIGEST_PREFIX_LEN, the list is then scanned. If an entry with that length already exists, the count field is incremented by one. If an entry with that length does not already exist, a new entry is added to the circular list in the proper place.

Figure 8:
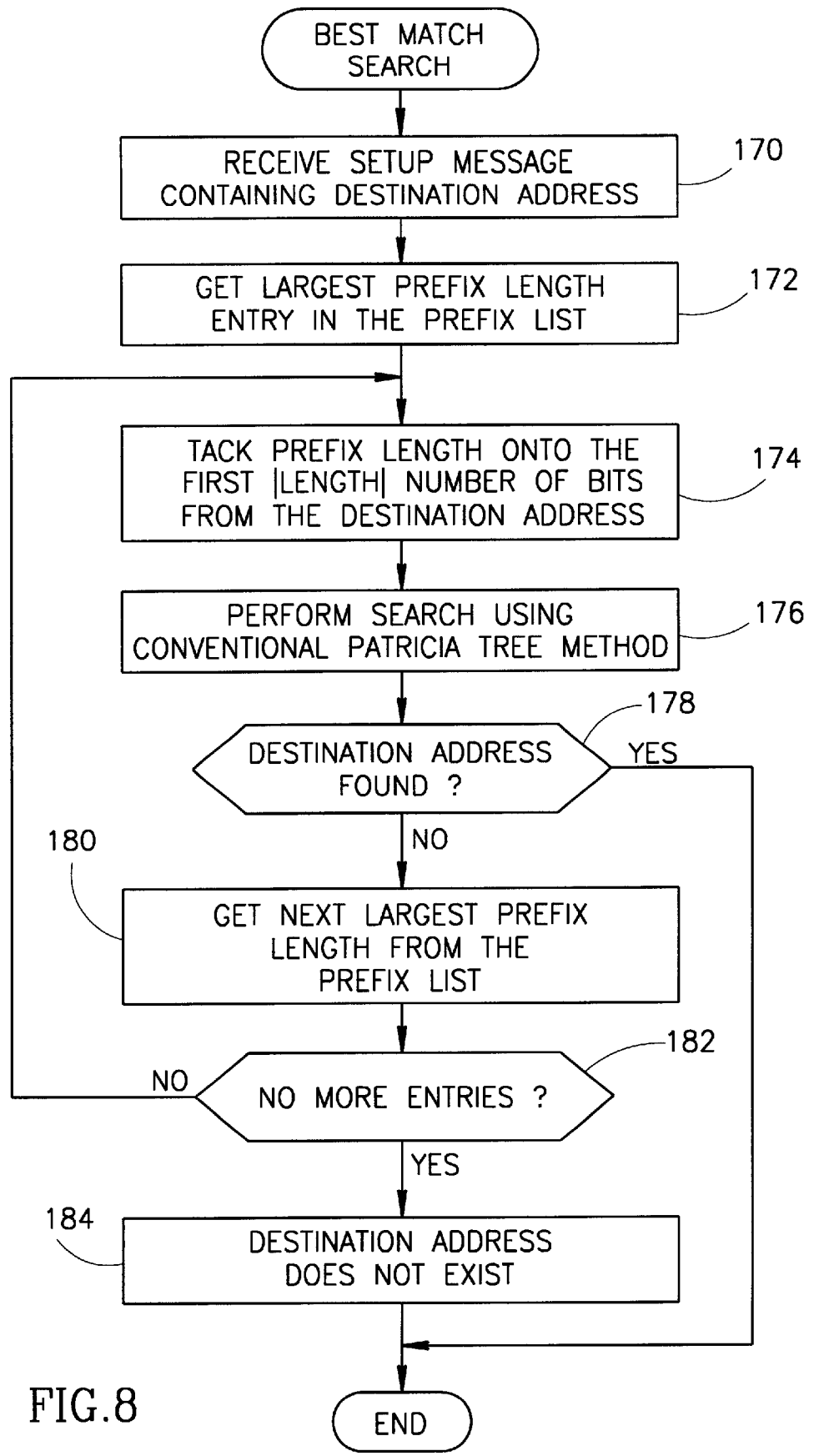
FIG. 8 is a flow diagram illustrating the method of performing a best match search using the conventional Patricia search trie tree method.

The method of performing a best match will now be described in more detail. A flow diagram illustrating the method of performing a best match search using the conventional Patricia search trie tree method is shown in FIG. 8. Initially, a node receives a SETUP message from the source user requesting a call be established to a destination address that is included in the SETUP message (step 170). Note that the maximum size of an ATM destination address is 20 bytes. The entry in the address list pointed to by the global variable HIGEST_PREFIX_LEN is then referenced (step 172). If the entry does not point to null, then a byte is added as a prefix to the destination address (step 174). The value of the byte added is equal to the address length value pointed to by the variable HIGEST_PREFIX_LEN. Note that, initially, the HIGEST_PREFIX_LEN number of bits from the destination address is used to form the search key. The length byte, having a value HIGEST_PREFIX_LEN, is concatenated onto the modified destination address.

For example, if the value HIGEST_PREFIX_LEN is equal to 102 and the destination address is 154 bits long, then the search key comprises: one byte whose value equals 102 concatenated onto the most significant 102 bits of the destination address, for a total search key bit length of 110 bits.

A search is then done on the tree using conventional Patricia search trie tree methods (step 176). If the destination address is found (step 178), the method exits. If the destination address was not found, then the next largest prefix length is determined from the prefix list (step 180). The next level down can be found by referencing the pointer in the next pointer field of the first entry. It is then determined whether the end of the address list was reached meaning there are no more entries in the prefix list (step 182). If no more entries exist, then it is concluded that the destination address does not exist in the tree (step 184). If the prefix list is not exhausted, the method continues by repeating steps 174 through 180.

Thus, if the destination address was not found and more entries exist in the tree, then a conventional Patricia search algorithm is performed again with the key comprising the address prefixed by the length byte. The byte added to the beginning of the address has a value of the length of the next smaller entry in the prefix list.

In this fashion, the address having the largest length will be found regardless of the fact that addresses with shorter prefixes have been stored in the tree. This permits the tree to hold addresses having variable lengths. In addition, the prefix list permits the tree to handle addresses that are prefixes of other addresses.

In terms of complexity, the method of the present invention is comparable in complexity to that of the conventional Patricia trie tree for a regular PNNI network. It is assumed that the complexity O of a traditional Patricia trie tree is given by O(N) where N represents the number of addresses in the tree. In a typical PNNI network, there are only 1 to 5 active levels of address prefixes, thus the complexity will be approximately 5×O(N)≅O(N).

Figure 9:
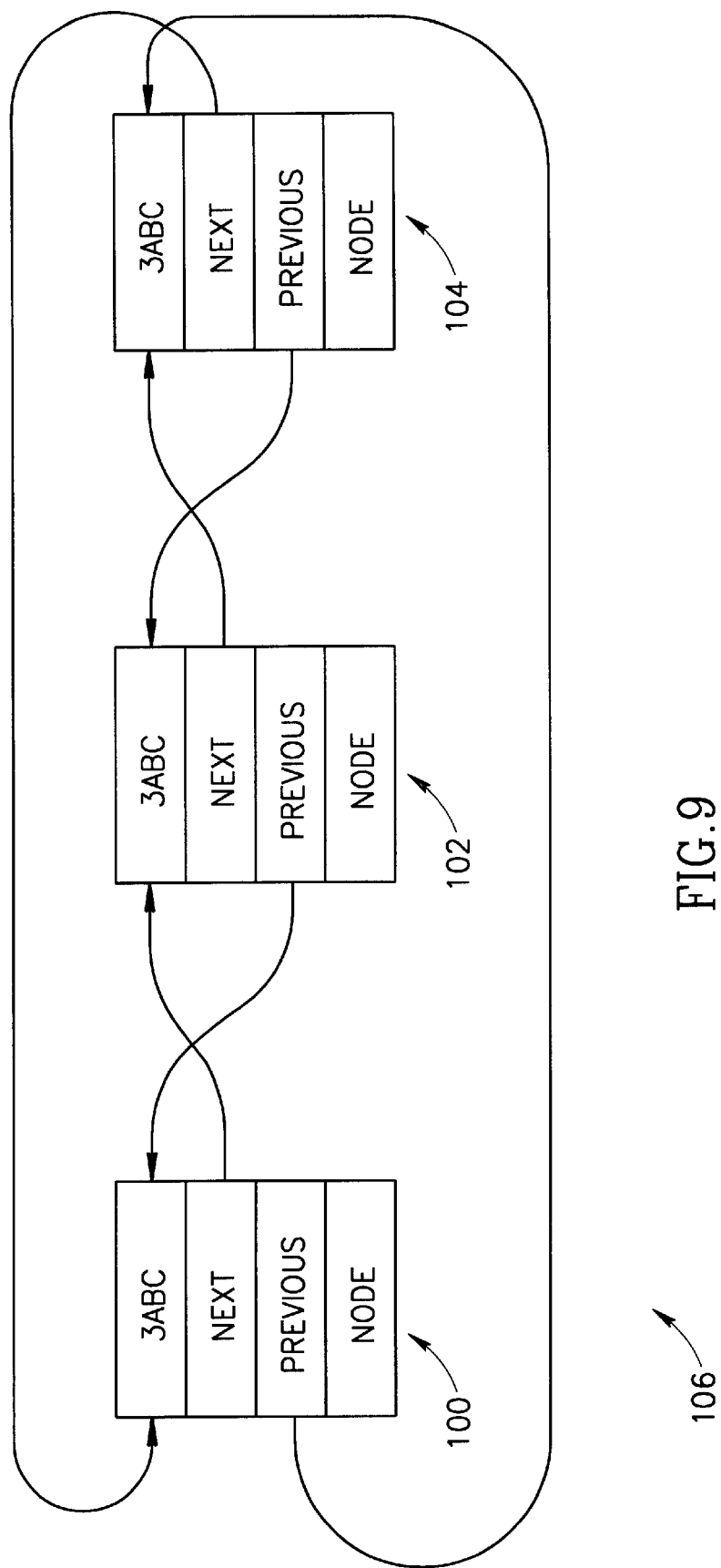
FIG. 9 is a diagram illustrating an example of a plurality of equal keys stored as a circularly linked list.

As discussed previously, the method of the present invention is capable of handling multiple nodes having the same destination address. All the keys having the same value, i.e., address, are stored in a circularly linked buffer each node of which is a key structure. A diagram illustrating an example of a plurality of equal keys stored as a circularly linked list is shown in FIG. 9. For example, the linked list 106 comprises three key structures 100, 102, 104 each having a the key (address) '3ABC'. This list would be stored in the tree in the position corresponding to the value of the key '3ABC'. The three keys are linked via the next and previous pointer fields. The node fields on each entry distinguish one key from the other as each points to different nodal information in the topology database.

Figure 10:
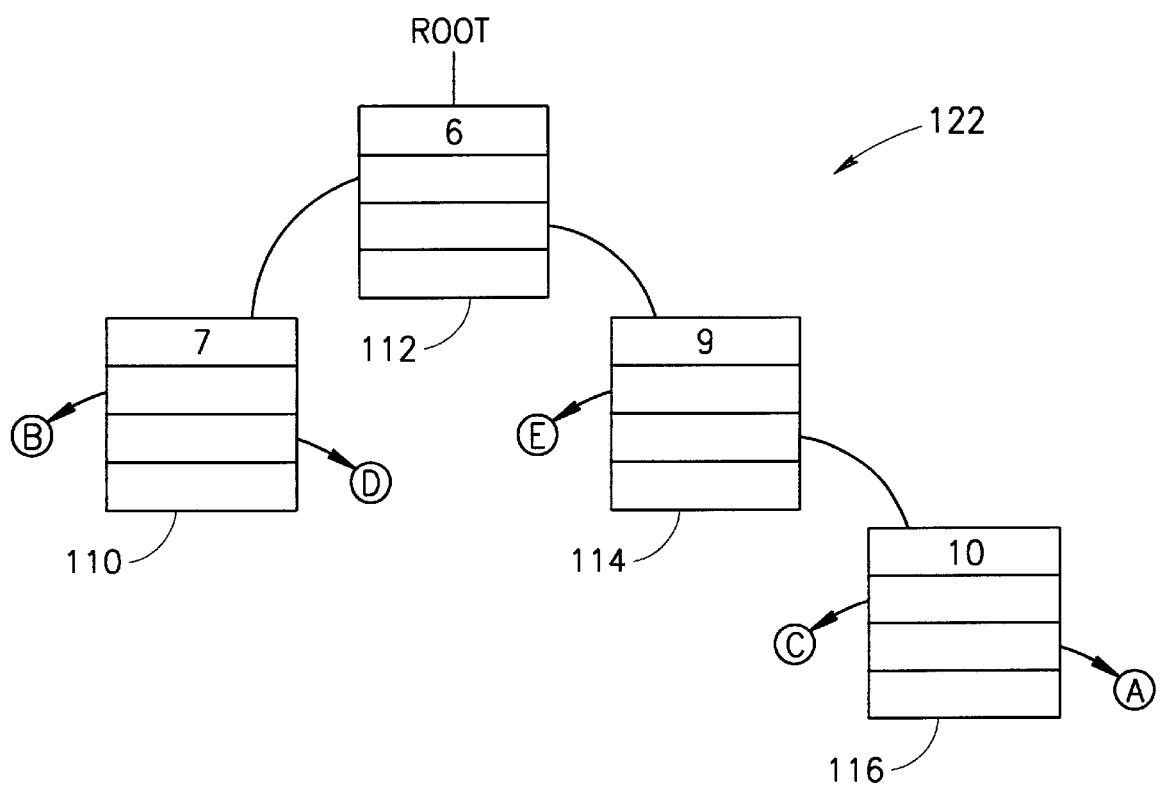
FIG. 10 is an example of a modified Patricia trie tree created using the method of the present invention.

An example illustrating the method of the present invention will now be presented. An example of a modified Patricia trie tree created using the method of the present invention is shown in FIG. 10. In this example, five destination addresses (i.e. keys) have been placed in the tree, generally referenced 122. A table 120 in the lower portion of FIG. 10 lists the five destination addresses including the one byte address prefix and the original address prefix. Key labels A, B, C, D, E, each enclosed in a circle, are used to abbreviate the addresses. A bit position index shows the bits of the address from position to a maximum of position 14 for addresses A, C, E. A length column indicates the length of the original prefix for each address. For example, the length of address C is 7, thus a byte having the value 7 is added to the beginning of the address.

Once the keys are constructed by the addition of the byte containing the address length, they are inserted into the tree using the conventional Patricia search trie tree algorithm. The results are the four nodes: node 112 off the root with a length of 6, node 114 with a length of 9, node 116 with a length of 10 and node 110 with a length of 7. The left and right pointers of each node point to either a key or another node forming a subtree. For example, the left pointer of node 114 points to a key representing address E. The right pointer, on the other hand, points to node 116, forming a subtree.

Figure 11:
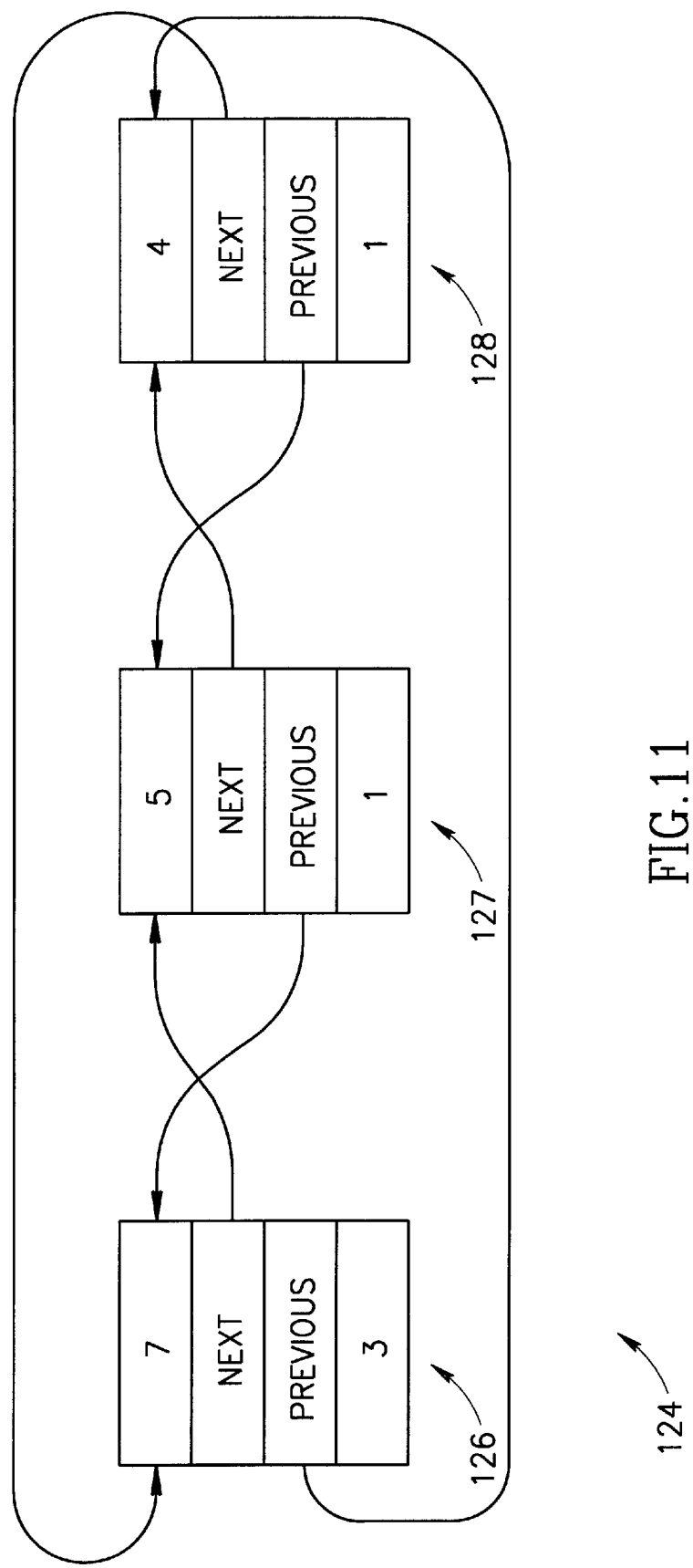
FIG. 11 is a diagram illustrating the prefix list corresponding to the example tree shown in FIG. 10.

The corresponding prefix list is shown in FIG. 11. The prefix list, 124 comprises three entries 126, 127, 128 corresponding to address lengths of 7, 5, 4, respectively. The prefix list is circularly linked with the entries placed in descending numerical order according to the length field.

If, for example, a destination having a value of address D is to be searched, the method will first tack on the value 7 to the address prefix. A search will then be performed which will not be successful. The byte prefix will then be replaced with the value 5 and the search repeated. This time, however, the search will be successful with the address D being found.

Figure 12:
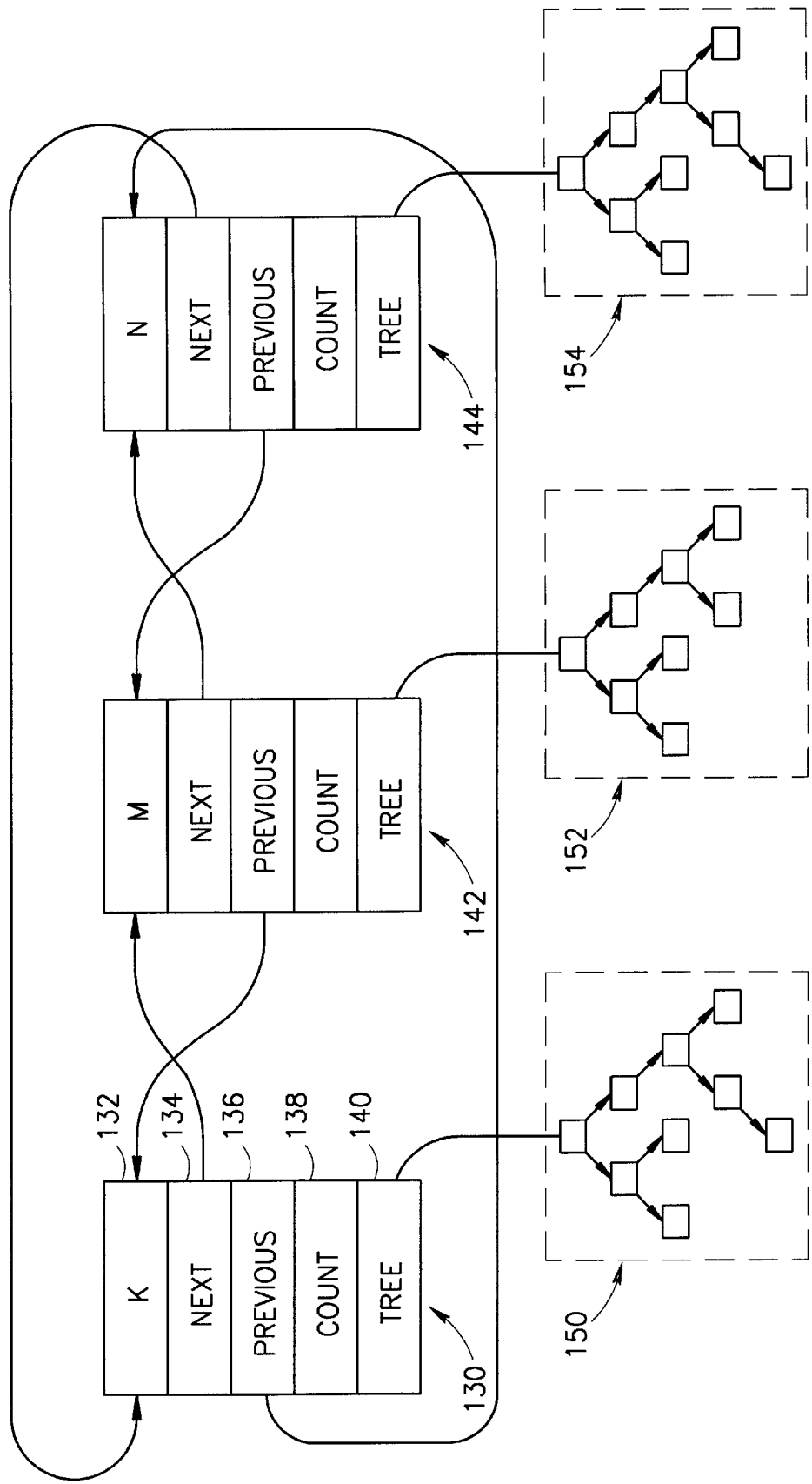
FIG. 12 is a diagram illustrating an alternative method of storing the nodes and keys wherein each address prefix level maintains a separate search trie tree.

In an alternative embodiment, multiple trees can be maintained wherein each tree corresponds to a different address length. A diagram illustrating an alternative method of storing the nodes and keys wherein each address prefix level maintains a separate search trie tree is shown in FIG. 12. In this example, the network comprises addresses having three different lengths K, M, N. Patricia tree 150 is associated with length K, tree 152 with length M and tree 154 with length N. Three entries 130, 142, 144, make up the prefix list, corresponding to lengths K, M, N, respectively. The node structure for each entry in the prefix list has an additional field to hold a pointer to the tree associated with that length. Thus, the fields of the entry comprise a length 132, next pointer field 134, previous pointer field 136, count field 138 and tree pointer field 140.

Each tree 150, 152, 154 comprises a conventional radix trie tree, i.e., Patricia tree. The advantage of splitting the tree into multiple trees is that there is no need to add the address length byte to the beginning of the addresses thus saving that particular step. Now, however, rather than requiring one radix tree to be handled, a plurality of trees must be maintained, one for each different length.

While the invention has been described with respect to a limited number of embodiments, it will be appreciated that many variations, modifications and other applications of the invention may be made.

What is claimed is:

1. A method of searching utilizing a conventional Patricia search tree constructed from one or more nodes for storing one or more keys, said method comprising the steps of:
   inserting a key into the tree:
   modifying said keys to be inserted into the tree so as to make each key unique with respect to other keys that may be prefixes thereof;
   inserting said modified each key into the tree utilizing a conventional Patricia search tree algorithm;
   providing a list which includes entries for each different key length represented in the tree, each entry in said list including a length field and a count field;
   updating said list so as to maintain said entries in descending numerical order of the length field;
   searching the tree for a search key:
   determining the largest key length in said list;
   concatenating the key length onto the search key to form a modified search key;
   searching said tree with said modified search key utilizing a conventional Patricia search algorithm; and
   determining the next largest key length in said list and repeating said steps of concatenating and searching until either said modified search key is found or the entries in said list are exhausted.

2. The method according to claim 1, wherein said step of modifying a key comprises the step of adding a number represented by a fixed length to the beginning of a key, said number having a value equal to the length of said key.

3. The method according to claim 1, wherein said step of modifying a key comprises the step of adding a byte of data to the beginning of a key, said byte of data having a value equal to the length of said key.

4. The method according to claim 1, wherein said keys may be of variable length and may be prefixes of other keys in the tree.

5. The method according to claim 1, wherein said keys comprise address prefixes.

6. The method according to claim 3, wherein said byte of data comprises a Private Network Node Interface (PNNI) level value.

7. The method according to claim 1, wherein said list comprises a circularly linked list.

8. The method according to claim 1, further comprising the step of incrementing the count field of an entry in said list when a key is added to said tree, said entry corresponding to the length of said key.

9. The method according to claim 1, further comprising the step of decrementing count field of an entry in said list when a key is removed from said tree, said entry corresponding to the length of said key.

10. The method according to claim 1, further comprising the step of removing an entry from said list when a key is removed from said tree and said key was the last key with that particular length.

11. The method according to claim 1, further comprising the step of storing a plurality of identical keys in said tree.

12. The method according to claim 11, wherein said step of storing comprises the step of storing said plurality of identical keys in a circularly linked list, said circularly linked list stored in said tree in similar fashion to that of other keys.

13. The method according to claim 1, wherein said of determining the largest key length in said list comprises the step of maintaining a longest length variable indicating the entry in said list with the longest length.

14. The method according to claim 7, wherein said step of determining the next largest length in said list comprises the step of traversing the list to the next entry pointed to by the current entry.

15. A method of searching utilizing a conventional Patricia search tree constructed from one or more nodes for storing one or more keys, said method comprising the steps of:
   inserting a key into the tree:
   modifying said keys to be inserted into the tree so as to make each key unique with respect to other keys that may be prefixes thereof, said step of modifying a key comprises adding a byte of data to the beginning of a key, said byte of data having a value equal to the length of said key, said byte of data comprises a Private Network Node Interface (PNNI) level value;
   inserting said modified each key into the tree utilizing a conventional Patricia search tree algorithm;
   providing a list which includes entries for each different key length represented in the tree, each entry in said list including a length field and a count field;
   updating said list so as to maintain said entries in descending numerical order of the length field;
   searching the tree for a search key:
   determining the largest key length in said list;
   concatenating the key length onto the search key to form a modified search key;
   searching said tree with said modified search key utilizing a conventional Patricia search algorithm; and
   determining the next largest key length in said list and repeating said steps of concatenating and searching until either said modified search key is found or the entries in said list are exhausted.

16. A method of searching utilizing a conventional Patricia search tree constructed from one or more nodes for storing one or more keys, said method comprising the steps of:
   inserting a key into the tree:
   modifying said keys to be inserted into the tree so as to make each key unique with respect to other keys that may be prefixes thereof;
   inserting said modified each key into the tree utilizing a conventional Patricia search tree algorithm;
   providing a list which includes entries for each different key length represented in the tree, each entry in said list including a length field and a count field, said list comprising a circularly linked list;
   updating said list so as to maintain said entries in descending numerical order of the length field;
   searching the tree for a search key:
   determining the largest key length in said list;
   concatenating the key length onto the search key to form a modified search key;
   searching said tree with said modified search key utilizing a conventional Patricia search algorithm; and
   determining the next largest key length in said list and repeating said steps of concatenating and searching until either said modified search key is found or the entries in said list are exhausted.

17. A method of searching utilizing a conventional Patricia search tree constructed from one or more nodes for storing one or more keys, said method comprising the steps of:

inserting a key into the tree:
- modifying said keys to be inserted into the tree so as to make each key unique with respect to other keys that may be prefixes thereof;
- inserting said modified each key into the tree utilizing a conventional Patricia search tree algorithm;
- storing a plurality of identical keys in a circularly linked list, said circularly linked list stored in said tree in similar fashion to that of other keys;
- providing a list which includes entries for each different key length represented in the tree, each entry in said list including a length field and a count field;
- updating said list so as to maintain said entries in descending numerical order of the length field;

searching the tree for a search key:
- determining the largest key length in said list;
- concatenating the key length onto the search key to form a modified search key;
- searching said tree with said modified search key utilizing a conventional Patricia search algorithm; and
- determining the next largest key length in said list and repeating said steps of concatenating and searching until either said modified search key is found or the entries in said list are exhausted.

18. A method of searching utilizing a conventional Patricia search tree constructed from one or more nodes for storing one or more keys, said method comprising the steps of:

inserting a key into the tree:
- modifying said keys to be inserted into the tree so as to make each key unique with respect to other keys that may be prefixes thereof;
- inserting said modified each key into the tree utilizing a conventional Patricia search tree algorithm;
- providing a list which includes entries for each different key length represented in the tree, each entry in said list including a length field and a count field;
- updating said list so as to maintain said entries in descending numerical order of the length field;

searching the tree for a search key:
- determining the largest key length in said list, said determining comprises the step of maintaining a longest length variable indicating the entry in said list with the longest length;
- concatenating the key length onto the search key to form a modified search key;
- searching said tree with said modified search key utilizing a conventional Patricia search algorithm; and
- determining the next largest key length in said list and repeating said steps of concatenating and searching until either said modified search key is found or the entries in said list are exhausted.

19. A method of searching utilizing a conventional Patricia search tree constructed from one or more nodes for storing one or more keys, said method comprising the steps of:

inserting a key into the tree:
- modifying said keys to be inserted into the tree so as to make each key unique with respect to other keys that may be prefixes thereof;
- inserting said modified each key into the tree utilizing a conventional Patricia search tree algorithm;
- providing a list which includes entries for each different key length represented in the tree, each entry in said list including a length field and a count field, said list comprising a circularly linked list;
- updating said list so as to maintain said entries in descending numerical order of the length field;

searching the tree for a search key:
- determining the largest key length in said list;
- concatenating the key length onto the search key to form a modified search key;
- searching said tree with said modified search key utilizing a conventional Patricia search algorithm; and
- determining the next largest key length in said list by traversing the list to the next entry pointed to by the current entry and repeating said steps of concatenating and searching until either said modified search key is found or the entries in said list are exhausted.

* * * * *